United States Patent Office 3,009,909
Patented Nov. 21, 1961

3,009,909
AZOBENZENE ESTERS
Warren W. Kaeding, Concord, Calif., assignor to The Dow Chemical Company, Midland, Mich., a corporation of Delaware
No Drawing. Filed Feb. 23, 1960, Ser. No. 10,028
6 Claims. (Cl. 260—207)

This invention is directed to azobenzene esters, more particularly to compounds represented by the formula

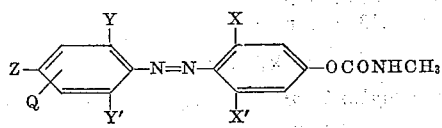

In this and succeeding formulas, X is hydrogen, lower alkyl containing from 1 to 4 carbon atoms, inclusive, methoxy or ethoxy, X' is hydrogen, methyl or ethyl, Y is hydrogen, chloro, lower alkyl containing from 1 to 3 carbon atoms, inclusive, methoxy or ethoxy, Y' is hydrogen, methyl or ethyl, Z is hydrogen, chloro, lower alkyl containing from 1 to 3 carbon atoms, inclusive, dimethylamino or diethylamino, Q is hydrogen or chloro and at least one of X, X', Y, Y', Z and Q is other than hydrogen.

The products of this invention are crystalline solids ranging in color from light orange to pale red. They are soluble in organic solvents such as methylene chloride, chloroform, alcohol and hot benzene-toluene mixture and of low solubility in pentane and hexane. The compounds are substantially insoluble in water.

The products of the present invention are useful as toxic components of parasiticide compositions. As such, they are adapted to be employed for the control of insects, internal parasites, bacteria and fungi. Certain of these compounds are also useful as aquatic herbicides for the control of water plants and weeds.

The azobenzene esters of the present invention may be prepared by the reaction of an appropriate phenylazophenol compound having the structure

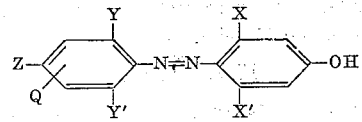

with methyl isocyanate, CH₃NCO, to produce the desired compounds. The reaction is preferably carried out in an inert solvent and in the presence of a catalytic amount of a tertiary amine. Suitable solvents for carrying out the reaction include dimethylformamide, methylene chloride, hexane or triethylamine. Suitable catalysts include triethylamine, trimethylamine and pyridine. Substantially equimolar proportions of the reactant or a slight excess of methyl isocyanate is employed. The reaction takes place in the temperature range of from about 25° to 39° C. at atmospheric pressure and is usually complete in a period of from about 50 minutes to 24 hours although the mixture may be allowed to stand for several days without detriment. Alternatively, the reaction may be carried out in the temperature range of from about 50° to 75° C. at a pressure greater than 1 atmosphere, i.e., in a closed vessel. Under these conditions, the reaction is usually complete in from about 15 minutes to about 1.5 hours. After completion of the reaction, the mixture is concentrated by vaporizing the excess solvent and then cooling to precipitate the desired azobenzene ester product. The latter may be recovered and purified according to conventional procedures.

In a preferred method for carrying out the reaction, about 10 percent molar excess of methyl isocyanate and a few drops of triethylamine catalyst are added at room temperature with stirring to a saturated solution of the appropriate phenylazophenol compound in an insert solvent. The reaction mixture is allowed to stand at room temperature for from about 60 minutes to 10 hours to obtain the desired azobenzene ester product. The latter usually precipitates in the reaction mixture as a solid and may be recovered by filtration. Alternatively, the solvent may be vaporized off and the product recovered as residue. The product may then be purified by recrystallization.

The following examples illustrate the present invention but are not to be construed as limiting.

EXAMPLE 1

*4-(p-dimethylaminophenylazo)-3,5-xylyl methylcarbamate*

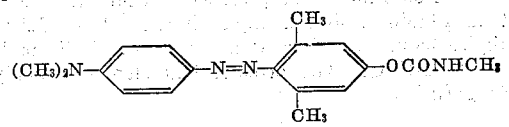

1.15 milliliters (0.0212 mole); 10 percent molar excess of methyl isocyanate and a few drops of triethylamine catalyst were added at room temperature with stirring to a saturated solution of 5.2 grams (0.019 mole) of 4-(p-dimethylaminophenylazo)-3,5-xylenol in methylene chloride. The reaction mixture was allowed to stand for 2 days at room temperature and the solvent evaporated therefrom to obtain a 4-(p-dimethylaminophenylazo)-3,5-xylyl methylcarbamate product as an orange solid. The latter was recrystallized from hot benzene to obtain a purified product as orange needles melting from 144° to 146° C. The product had a nitrogen content of 17.16 percent; the theoretical value is 17.17 percent.

EXAMPLE 2

*3-tertiary-butyl-4-phenylazophenyl methylcarbamate*

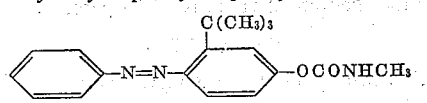

2.2 milliliters (0.039 mole) of methyl isocyanate and a few drops of triethylamine catalyst were added at room temperature with stirring to 9.5 grams (0.040 mole) of 3-tertiary-butyl-4-phenlazophenol (M.P. 107°–108° C.) in methylene chloride. The reaction mixture was allowed to stand at room temperature for 24 hours and the solvent thereafter removed by vaporization to obtain the desired 3-tertiary-butyl-4-phenylazophenyl methylcarbamate product. The latter, after recrystallization from hexane, was a yellow crystalline solid melting at 146°–147° C.

EXAMPLE 3

*4-(o-methoxyphenylazo)-3,5-xylyl methylcarbamate*

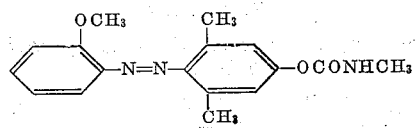

In a similar manner, 2.0 milliliters (0.035 mole) of methyl isocyanate and a few drops of triethylamine catalyst were added to a saturated solution of 7.0 grams (0.027 mole) of 4-(o-methoxyphenylazo)-3,5-xylenol (M.P. 161°–163° C.) in 200 milliliters of methylene chloride. The resulting mixture was allowed to stand for several days at room temperature and the solvent vaporized therefrom to obtain the desired 4-(o-methoxyphenylazo)-3,5-xylyl methylcarbamate as an orange solid melting at 124°–125° C.

EXAMPLE 4

*4-phenylazo-3,5-xylyl methylcarbamate*

In a similar manner, 2.25 milliliters (0.04 mole) of methyl isocyanate was reacted with 7.5 grams (.033 mole) of 4-phenylazo-3,5-xylenol (M.P. 102°–103° C.) in the presence of a few drops of triethylamine catalyst in methylene chloride solution to obtain a 4-phenylazo-3,5-xylyl methylcarbamate product as an orange colored solid melting at 120°–121° C. The product had a nitrogen content of 14.76 percent; the theoretical value is 14.83 percent.

EXAMPLE 5

*4-(p-diethylaminophenylazo)-3,5-xylyl methylcarbamate*

In a similar manner, 1.5 milliliters (0.026 mole) of methyl isocyanate was reacted with 5.80 grams (0.0195 mole) of 4-(p-diethylaminophenylazo)-3,5-xylenol in methylene chloride in the presence of triethylamine catalyst to obtain a 4-(p-diethylaminophenylazo)-3,5-xylyl methylcarbamate product as a red colored solid melting at 148°–150° C. The product had elemental analyses as follows:

|  | Carbon | Hydrogen | Nitrogen |
|---|---|---|---|
| Theoretical | 67.77 | 7.39 | 15.81 |
| Found | 67.45 | 7.51 | 15.64 |

EXAMPLE 6

*4-p-tolylazo-3,5-xylyl methylcarbamate*

In a similar manner, 2.4 milliliters (0.042 mole) of methyl isocyanate were reacted with a methylene chloride solution of 10 grams (0.042 mole) of 4-p-tolylazo-3,5-xylenol (M.P. 96°–97° C.) in the presence of triethylamine catalyst to obtain a 4-p-tolylazo-3,5-xylyl methylcarbamate product as a red colored solid melting at 145°–146° C. The product had a nitrogen content of 14.01 percent; the theoretical value is 14.13 percent.

EXAMPLE 7

*4-(2,5-dichlorophenylazo)-3,5-xylyl methylcarbamate*

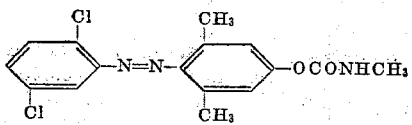

In a manner similar to that previously described, 0.8 milliliter (0.014 mole) of methyl isocyanate and a few drops of triethylamine catalyst were added at room temperature with stirring to a saturated dimethylformamide solution of 3.7 grams (0.0125 mole) of 4-(2,5-dichlorophenylazo)-3,5-xylenol (M.P. 180°–182° C.) to obtain a 4-(2,5-dichlorophenylazo)-3,5-xylyl methylcarbamate product as a red colored solid melting at 208°–209° C.

EXAMPLE 8

*3-ethoxy-4-(o-methoxyphenylazo)-phenyl methylcarbamate*

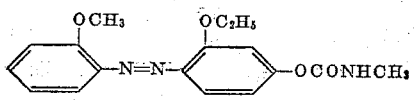

In a manner similar to that previously described, 0.8 milliliter (0.014 mole) of methyl isocyanate and a few drops of triethylamine catalyst were added at room temperature with stirring to a saturated solution of 3.7 grams (0.013 mole) of 3-ethoxy-4-(o-methoxyphenylazo)-phenol (M.P. 180°–182° C.) in about 300 milliliters of dimethylformamide to obtain a 3-ethoxy-4-(o-methoxyphenylazo)-phenyl methylcarbamate product melting at 138°–140° C.

EXAMPLE 9

*4-(3,4-dichlorophenylazo)-3,5-xylyl methylcarbamate*

In a manner similar to that previously described, 3.2 milliliters (0.057 mole, 10 percent molar excess) of methyl isocyanate and a few drops of triethylamine catalyst were added with stirring to a saturated solution of 15 grams (0.051 mole) of 4-(3,4-dichlorophenylazo)-3,5-xylenol (M.P. 146°–147° C.) in 400 milliliters of methylene dichloride to obtain a 4-(3,4-dichlorophenylazo)-3,5-xylyl methylcarbamate product as orange fluffy crystals melting at 169°–170° C. The product had a nitrogen content of 12.02 percent and a chlorine content of 19.88 percent. The theoretical values are 11.93 percent and 20.13 percent, respectively.

EXAMPLE 10

*p-(p-Dimethylaminophenylazo)-phenyl methylcarbamate*

In a manner similar to that previously described, 1 milliliter (0.018 mole, a large molar excess) of methyl isocyanate and a few drops of triethylamine catalyst were added with stirring to a saturated solution of 0.5 gram (0.002 mole) of p-(p-dimethylaminophenylazo)-phenol in 50 milliliters of methylene chloride to obtain a p-(p-dimethylaminophenylazo)-phenyl methylcarbamate product as golden brown crystals melting at 165°–167° C. The product had a nitrogen content of 18.69 percent; the theoretical value is 18.78 percent.

EXAMPLE 11

In preparations carried out in a manner similar to that previously described, the following compounds were prepared:

4-(p-chlorophenylazo)-3,5-xylyl methylcarbamate melting at 142°–143° C. by the reaction of methyl isocyanate with 4-(p-chlorophenylazo)-3,5-xylenol.

3-tertiary-butyl-4-(o-methoxyphenylazo)-phenyl methylcarbamate melting at 144°–145° C. by the reaction of methyl isocyanate with 3-tertiary-butyl-4-(o-methoxyphenylazo)-phenol in the presence of tertiary amine catalyst.

4-(2,6-xylylazo)-3,5-xylyl methylcarbamate having a melting point of 146°–147° C. by the reaction of 4-(2,6-xylylazo)-3,5-xylenol with methyl isocyanate in the presence of triethylamine catalyst.

EXAMPLE 12

In similar reactions the following compounds are prepared:

4-(2,4-dichlorophenylazo)-3-methoxyphenyl methylcarbamate by the reaction of 4-(2,4-dichlorophenylazo)-3-methoxyphenol and methyl isocyanate in the presence of triethylamine catalyst.

4-(o-tolylazo)-phenyl methylcarbamate by the reaction of 4-(o-tolylazo)-phenol and methyl isocyanate in the presence of triethylamine catalyst.

4-phenylazo-m-tolyl methylcarbamate by the reaction of 4-phenylazo-m-cresol with methyl isocyanate in the presence of triethylamine catalyst.

4-(2,5-dichlorophenylazo)-m-tolyl methylcarbamate by the reaction of 4-(2,5-dichlorophenylazo)-m-cresol and methyl isocyanate in the presence of triethylamine catalyst.

4-(2,5-dichlorophenylazo)-phenyl methylcarbamate by the reaction of 4-(2,5-dichlorophenylazo)-phenol and methyl isocyanate in the presence of triethylamine catalyst.

3,5-diethyl-4-phenylazophenyl methylcarbamate by the reaction of 3,5-diethyl-4-phenylazophenol and methyl isocyanate in the presence of triethylamine catalyst.

4-(2,4-diisopropylphenylazo)-phenyl methylcarbamate by the reaction of 4-(2,4-diisopropylphenylazo)-phenol and methylcarbamate in the presence of triethylamine catalyst.

4-(o-normal-propylphenylazo)-phenyl methylcarbamate by the reaction of 4-(o-normal-propylphenylazo)-phenol and methyl isocyanate in the presence of triethylamine catalyst.

4-(2,6-diethylphenylazo)-phenyl methylcarbamate by the reaction of 4-(2,6-diethylphenylazo)-phenol and methyl isocyanate in the presence of triethylamine catalyst.

4-(o-ethylphenylazo)-phenyl methylcarbamate by the reaction of 4-(o-ethylphenylazo)-phenol and methyl isocyanate in the presence of triethylamine catalyst.

4-(3-chlorophenylazo)-phenyl methylcarbamate by the reaction of 4-(3-chlorophenylazo)-phenol and methyl isocyanate in the presence of triethylamine catalyst.

4-(p-dimethylaminophenylazo)-m-tolyl methylcarbamate by the reaction of 4-(p-dimethylaminophenylazo)-m-cresol and methyl isocyanate in the presence of triethylamine catalyst.

3-methoxy-4-(2,4-dimethylphenylazo)phenyl methylcarbamate by the reaction of 3-methoxy-4-(2,4-dimethylphenylazo)phenol and methyl isocyanate in the presence of triethylamine catalyst.

3-ethoxy-4-(2-chloro-p-tolylazo)phenyl methylcarbamate by the reaction of the 3-ethoxy-4-(2-chloro-p-tolylazo)phenol and methyl isocyanate in the presence of triethylamine catalyst.

3-methoxy-4-(4-chloro-o-tolylazo)-phenyl methylcarbamate by the reaction of 3-methoxy-4-(4-chloro-p-tolylazo)phenol and methyl isocyanate in the presence of triethylamine catalyst.

3-methoxy-4-(2-chloro-4-dimethylaminophenylazo)-phenyl methylcarbamate by the reaction of 3-methoxy-4-(2-chloro-4-dimethylaminophenylazo)phenol and methyl isocyanate in the presence of triethylamine catalyst.

3-ethoxy-4-(4-diethylamino-o-tolylazo)phenyl methylcarbamate by the reaction of 3-ethoxy-4-(4-diethylamino-o-tolylazo)phenol and methyl isocyanate in the presence of triethylamine catalyst.

The products of the present invention are useful as insecticides and are adapted to be employed for the control of such insect species as Mexican bean beetle and Southern army worm. In representative operations for the control of insects, 4-(p-dimethylaminophenylazo)-3,5-xylyl methylcarbamate, 4-(o-methoxyphenylazo)-3,5-xylyl methylcarbamate, 4-(phenylazo)-3,5-xylyl methylcarbamate, 4-(p-diethylaminophenylazo)-3,5-xylyl methylcarbamate, 4-(2,6-xylylazo)-3,5-xylyl methylcarbamate and 4-(p-chlorophenylazo)-3,5-xylyl methylcarbamate were separately dispersed in water to prepare aqueous spray compositions containing 50 parts per million by weight of one of the azobenzene esters per million parts by weight of ultimate spray mixture. The compositions were separately applied to series of cranberry plants in amounts sufficient to wet the foliage. The leaf surfaces were allowed to dry and the plants then infested with a known number of Mexican bean beetle (*Epilachna varivestis*). Seven days after infestation, the plants were examined to ascertain control of Mexican bean beetle attributable to the test compounds. In all cases complete kills of the insert were obtained.

The compounds of this invention are also useful for the control of helminths which infest the gastro-intestinal trace of warm-blooded animals such as Bunostomum sp., Oesophagostomum sp., Oestertagi sp., Trichosterongulus sp., and Cooperia sp. Furthermore, the compounds of this invention are useful for the control of bacteria and fungi and are thus adapted to be employed as toxic constituents in germicidal compositions.

The phenylazophenol reactants of the present invention may be prepared by a known azo-coupling method wherein an appropriate diazotized aniline compound is coupled with an appropriate phenol compound. In a convenient method, an appropriate aniline compound is diazotized with nitrous acid in cold aqueous solution, and the latter added with vigorous stirring to an aqueous alkaline solution of an appropriate phenol compound at a temperature in the range of from 0° to 5° C. A reaction takes place rapidly with the formation of the desired phenylazophenol reactant as a solid which precipitates in the reaction mixture. The latter is recovered by filtration and purified if desired by conventional procedures.

I claim:

1. A compound having the structure

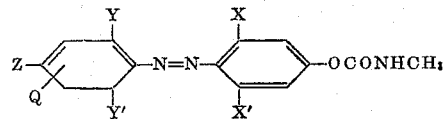

wherein X is a radical selected from the group consisting of hydrogen, lower alkyl containing from 1 to 4 carbon atoms, inclusive, methoxy and ethoxy, X' is a radical selected from the group consisting of hydrogen, methyl and ethyl, Y is a radical selected from the group consisting of hydrogen, chloro, lower-alkyl containing from 1 to 3 carbon atoms, inclusive, methoxy and ethoxy, Y' is a radical selected from the group consisting of hydrogen, methyl and ethyl, Z is a radical selected from the group consisting of hydrogen, chloro, lower alkyl containing from 1 to 3 carbon atoms, inclusive, dimethylamino and diethylamino, Q is a radical selected from the group consisting of hydrogen and chloro and at least one of X, X', Y, Y', Z and Q is a radical other than hydrogen.

2. 4-(p-dimethylaminophenylazo)-3,5-xylyl methylcarbamate.

3. 4-(o-methoxyphenylazo)-3,5-xylyl methylcarbamate.

4. 4-phenylazo-3,5-xylyl methylcarbamate.

5. 4-(p-diethylaminophenylazo)-3,5-xylyl methylcarbamate.

6. 4-p-tolylazo-3,5-xylyl methylcarbamate.

No references cited.